US012198261B2

(12) United States Patent
Huang et al.

(10) Patent No.: US 12,198,261 B2
(45) Date of Patent: Jan. 14, 2025

(54) TRANSITIONING CONTENT IN VIEWS OF THREE-DIMENSIONAL ENVIRONMENTS USING ALTERNATIVE POSITIONAL CONSTRAINTS

(71) Applicant: APPLE INC., Cupertino, CA (US)

(72) Inventors: David H. Huang, San Mateo, CA (US); Bart Trzynadlowski, Reno, NV (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/219,822

(22) Filed: Jul. 10, 2023

(65) Prior Publication Data

US 2023/0351676 A1  Nov. 2, 2023

Related U.S. Application Data

(63) Continuation of application No. PCT/US2022/015590, filed on Feb. 8, 2022.
(Continued)

(51) Int. Cl.
*G06F 3/01* (2006.01)
*G06F 3/04815* (2022.01)
*G06T 15/20* (2011.01)

(52) U.S. Cl.
CPC .............. *G06T 15/20* (2013.01); *G06F 3/012* (2013.01); *G06F 3/013* (2013.01); *G06F 3/04815* (2013.01); *G06T 2200/24* (2013.01)

(58) Field of Classification Search
None
See application file for complete search history.

(56) References Cited

U.S. PATENT DOCUMENTS

2014/0333666 A1   11/2014   Poulos et al.
2015/0312561 A1   10/2015   Hoof et al.
(Continued)

FOREIGN PATENT DOCUMENTS

WO   2020191101 A1   9/2020

OTHER PUBLICATIONS

European Patent Office, International Search Report and Written Opinion of the International Searching Authority, International Application No. PCT/US2022/015590, 14 pages, Apr. 21, 2022.
(Continued)

*Primary Examiner* — Matthew Yeung
(74) *Attorney, Agent, or Firm* — Thompson Hine LLP

(57) ABSTRACT

Various implementations disclosed herein include devices, systems, and methods that detects user interactions with a content object of a set of views of a three-dimensional (3D) environment and provides a different set of views with a different positional constraint. For example, an example process may include associating a content object with a region of a physical environment, providing a first set of views of the physical environment, wherein the content object is displayed using a first positional constraint when included in the first set of views, detecting an interaction associated with the region of the physical environment, and in accordance with detecting the interaction, providing a second set of views of the physical environment, wherein the content object is displayed using a second positional constraint when included in the second set of views, the second positional constraint different than the first positional constraint.

16 Claims, 8 Drawing Sheets

Related U.S. Application Data

(60) Provisional application No. 63/149,404, filed on Feb. 15, 2021.

(56) References Cited

U.S. PATENT DOCUMENTS

| | | | |
|---|---|---|---|
| 2019/0172262 A1* | 6/2019 | McHugh | G06F 3/011 |
| 2020/0226835 A1 | 7/2020 | Farchy et al. | |
| 2021/0397252 A1* | 12/2021 | Nakade | G06F 3/04815 |

OTHER PUBLICATIONS

Jo, D. and Kim, G.J., IoT + AR: pervasive and augmented environments for "Digi-log" shopping experience, Human-centric Computing and Information Sciences, 9:1, 17 pages, 2019.

* cited by examiner

TRANSITIONING CONTENT IN VIEWS OF THREE-DIMENSIONAL ENVIRONMENTS USING ALTERNATIVE POSITIONAL CONSTRAINTS

CROSS-REFERENCE TO RELATED APPLICATIONS

This patent application is a continuation of International Application No. PCT/US2022/015590 filed Feb. 8, 2022, which claims the benefit of U.S. Provisional Application No. 63/149,404 filed Feb. 15, 2021, entitled "TRANSITIONING CONTENT IN VIEWS OF THREE-DIMENSIONAL ENVIRONMENTS USING ALTERNATIVE POSITIONAL CONSTRAINTS," each of which is incorporated herein by this reference in its entirety.

TECHNICAL FIELD

The present disclosure generally relates to displaying content with electronic devices, and in particular, to systems, methods, and devices to transition content in views of three-dimensional (3D) environments using alternative positional constraints.

BACKGROUND

Electronic devices are often used to present users with virtual objects, such as application content, that complement surrounding physical environments that are perceivable in views provided by such electronic devices. Some existing techniques for providing these three-dimensional (3D) environments (e.g., while a user is moving through the physical environment) require increased computational processes. Additionally, in some circumstances, users may experience discomfort, such as motion sickness, during viewing of such 3D environments.

SUMMARY

Various implementations disclosed herein include devices, systems, and methods that detect interactions with a content object and provide a different set of views with a different positional constraint to improve a user experience (e.g., while wearing a head mounted display (HMD)). Some implementations allow interactions with a virtual content object (e.g., an application widget). For example, a text application may be associated with a widget (e.g., a virtual icon) that can be anchored to a particular region (e.g., landmark) of a physical environment. The widget can be world-locked to a three-dimensional (3D) location, such as a particular location on an object (e.g., a face of a refrigerator). Being anchored to a particular region or object, provides views of the widget with six degrees of freedom (DoF), such that as a user moves throughout the physical environment, including the user's head translating and rotating, the widget would appear on the face of the refrigerator, without moving as if it was fixed to reduce motion sickness during viewing of a 3D environment (e.g., visual and/or auditory content that could include a real-world physical environment, virtual content, or a combination of each).

In some implementations, the world-locked widget can remain in the location on the face of the refrigerator, similar to an application widget on a screen of a mobile device, until interactions with the widget are detected. The techniques described herein can detect interactions from a user with the widget. Interactions may include a gaze of the user (e.g., directly looking at the widget for a particular amount of time), a particular movement of the user with his or her hands such as trying to reach or point at the widget, a verbal command, and the like. For example, for a text application, a notification may be provided of a new message, such as a virtual notification provided to the user in the current view, or a spatialized audio ping from the location of the widget. The user then would provide some action to indicate he or she wants to see the new message (e.g., detecting that the user is gazing at the refrigerator, moved closer to the refrigerator, pointed at the refrigerator, etc.). After detecting an interaction with the widget, the techniques described herein would provide the text application in a set of views as a less world-locked position (e.g., rotated towards the user or moved closer to the user) or a device-locked position. Thus, providing a hybrid localization-based heads up display (HUD) system between world-locked placement of content (widgets, utilities, apps, etc.) that can transition to head-locked (zero degree of freedom when necessary).

In some implementations, a device (e.g., a handheld, laptop, desktop, or head-mounted device (HMD)) provides views of a 3D environment (e.g., a visual and/or auditory experience) to the user and obtains, with a sensor, physiological data (e.g., gaze characteristics) and motion data (e.g., controller moving the avatar, head movements, etc.) associated with a response of the user. Based on the obtained physiological data, the techniques described herein can determine a user's vestibular cues during the viewing of a 3D environment (e.g., an extended reality (XR) environment) by tracking the user's gaze characteristic(s) and other interactions (e.g., user movements in the physical environment). Based on the vestibular cues, the techniques can detect interactions with a content object and provide a different set of views with a different positional constraint to improve a user experience while viewing the 3D environment.

In general, one innovative aspect of the subject matter described in this specification can be embodied in methods, at an electronic device having a processor, that include the actions of associating a content object with a region of a physical environment, providing a first set of views of the physical environment, wherein the content object is displayed using a first positional constraint when included in the first set of views, detecting an interaction associated with the region of the physical environment, and in accordance with detecting the interaction, providing a second set of views of the physical environment, wherein the content object is displayed using a second positional constraint when included in the second set of views, the second positional constraint different than the first positional constraint.

These and other embodiments can each optionally include one or more of the following features.

In some implementations, the first positional constraint includes a world-locked position in which location and rotation of the content object are fixed relative to a coordinate system of the physical environment when the content object is displayed.

In some implementations, the second positional constraint includes a device-locked position in which location and rotation of the content object are fixed relative to a coordinate system of the electronic device when the content object is displayed.

In some implementations, the content object includes an associated content application window, and displaying the content object using the second positional constraint includes displaying the associated content application window in a device-locked position in which location and rotation of the associated content application window are fixed relative to a coordinate system of the electronic device when the associated content application window is displayed, and displaying the content object in a world-locked position in which location and rotation of the content object are fixed relative to a coordinate system of the physical environment when the content object is displayed.

In some implementations, the method further includes detecting a second interaction associated with the region of the physical environment with respect to the display of the content object, and in accordance with detecting the second interaction, providing a third set of views of the physical environment.

In some implementations, the content object is displayed using the first positional constraint when included in the third set of views. In some implementations, the content object is not displayed in the third set of views.

In some implementations, associating the content object with the region of the physical environment is based on identifying the region of the physical environment.

In some implementations, associating the content object with the region of the physical environment includes obtaining an image or a map of the physical environment that includes the region; and performing object recognition associated with an object type or an area type associated with the region of the physical environment to identify the region of the physical environment.

In some implementations, detecting the interaction associated with the region of the physical environment includes tracking a gaze direction, and detecting that the gaze direction corresponds to the region of the physical environment.

In some implementations, detecting the interaction associated with the region of the physical environment includes determining that the electronic device moved within a distance threshold of the region of the physical environment.

In some implementations, detecting the interaction associated with the region of the physical environment includes tracking a pose of the electronic device relative to the physical environment, and detecting, based on the pose of the electronic device, that a view of a display of the electronic device is oriented towards the content object.

In some implementations, the region of the physical environment is an object within the physical environment.

In some implementations, the content object is an application widget.

In some implementations, the electronic device is a head-mounted device (HMD).

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
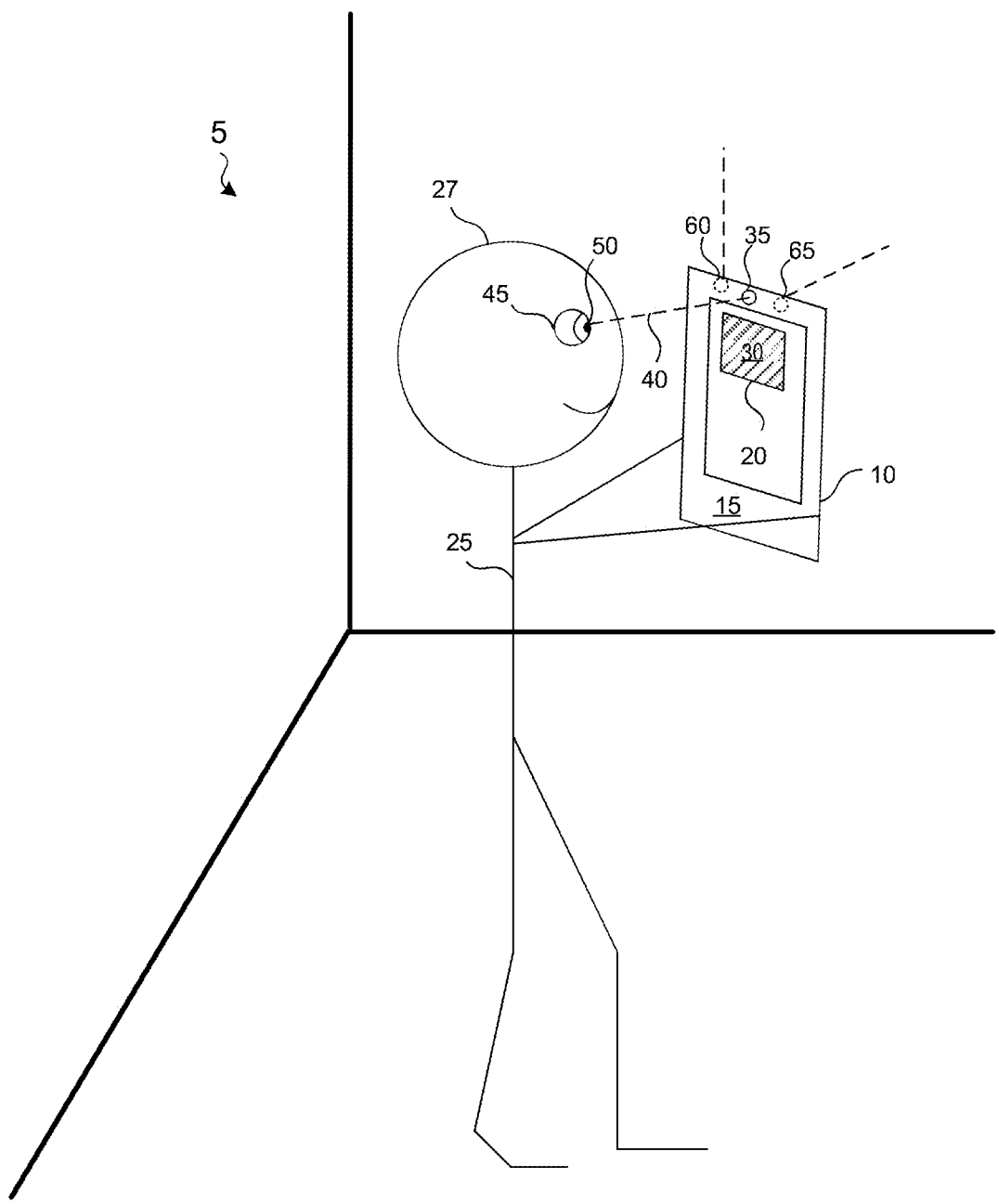
FIG. 1 illustrates a device displaying a visual environment and obtaining physiological data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates a real-world environment 5 including a device 10 with a display 15. In some implementations, the device 10 presents content 20 to a user 25, and a visual characteristic 30 that is associated with content 20. For example, content 20 may be a button, a user interface icon, a text box, a graphic, etc. In some implementations, the visual characteristic 30 associated with content 20 includes visual characteristics such as hue, saturation, size, shape, spatial frequency, motion, highlighting, etc. For example, content 20 may be displayed with a visual characteristic 30 of green highlighting covering or surrounding content 20.

In some implementations, content 20 may represent a visual 3D environment (e.g., an extended reality (XR) environment), and the visual characteristic 30 of the 3D environment may continuously change. Head pose measurements may be obtained by the IMU or other tracking systems. In one example, a user can perceive a real-world environment while holding, wearing, or being proximate to an electronic device that includes one or more sensors that obtains physiological data to assess an eye characteristic that is indicative of the user's gaze characteristics, and motion data of a user.

In some implementations, the visual characteristic 30 is a feedback mechanism for the user that is specific to the views of the 3D environment (e.g., a visual or audio cue presented during the viewing). In some implementations, the view of the 3D environment (e.g., content 20) can occupy the entire display area of display 15. For example, content 20 may include a sequence of images as the visual characteristic 30 and/or audio cues presented to the user (e.g., 360-degree video on a head mounted device (HMD)).

The device 10 obtains physiological data (e.g., pupillary data) from the user 25 via a sensor 35. For example, the device 10 obtains eye gaze characteristic data 40. While this example and other examples discussed herein illustrate a single device 10 in a real-world environment 5, the techniques disclosed herein are applicable to multiple devices as well as to other real-world environments. For example, the functions of device 10 may be performed by multiple devices.

In some implementations, as illustrated in FIG. 1, the device 10 is a handheld electronic device (e.g., a smartphone or a tablet). In some implementations, the device 10 is a wearable HMD. In some implementations the device 10 is a laptop computer or a desktop computer. In some implementations, the device 10 has a touchpad and, in some implementations, the device 10 has a touch-sensitive display (also known as a "touch screen" or "touch screen display").

In some implementations, the device 10 includes sensors 60, 65 for acquiring image data of the physical environment. The image data can include light intensity image data and/or depth data. For example, sensor 60 may be a video camera for capturing RGB data, and sensor 65 may be a depth sensor (e.g., a structured light, a time-of-flight, or the like) for capturing depth data.

In some implementations, the device 10 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content shown on the display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 employs various physiological sensor, detection, or measurement systems. In an exemplary implementation, detected physiological data includes head pose measurements determined by an IMU or other tracking system. In some implementations, detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, a machine learning model (e.g., a trained neural network) is applied to identify patterns in physiological data, including identification of physiological responses to viewing the 3D environment (e.g., content 20 of FIG. 1). Moreover, the machine learning model may be used to match the patterns with learned patterns corresponding to indications of interest or intent of the user 25 interactions. In some implementations, the techniques described herein may learn patterns specific to the particular user 25. For example, the techniques may learn from determining that a peak pattern represents an indication of interest or intent of the user 25 in response to a particular visual characteristic 30 when viewing the 3D environment, and use this information to subsequently identify a similar peak pattern as another indication of interest or intent of the user 25. Such learning can take into account the user's relative interactions with multiple visual characteristics 30, in order to further adjust the visual characteristic 30 and enhance the user's physiological response to the 3D environment.

In some implementations, the location and features of the head 27 of the user 25 (e.g., an edge of the eye, a nose or a nostril) are extracted by the device 10 and used in finding coarse location coordinates of the eyes 45 of the user 25, thus simplifying the determination of precise eye 45 features (e.g., position, gaze direction, etc.) and making the gaze characteristic(s) measurement more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move his or her head 27 and eyes 45 freely while reducing or eliminating the need to actively track the head 27 using sensors or emitters on the head 27.

By tracking the eyes 45, some implementations reduce the need to re-calibrate the user 25 after the user 25 moves his or her head 27. In some implementations, the device 10 uses depth information to track the pupil's 50 movement, thereby enabling a reliable present pupil diameter 55 to be calculated based on a single calibration of user 25. Utilizing techniques such as pupil-center-corneal reflection (PCCR), pupil tracking, and pupil shape, the device 10 may calculate the pupil diameter 55, as well as a gaze angle of the eye 45 from a fixed point of the head 27, and use the location information of the head 27 in order to re-calculate the gaze angle and other gaze characteristic(s) measurements. In addition to reduced recalibrations, further benefits of tracking the head 27 may include reducing the number of light projecting sources and reducing the number of cameras used to track the eye 45.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Figure 2:
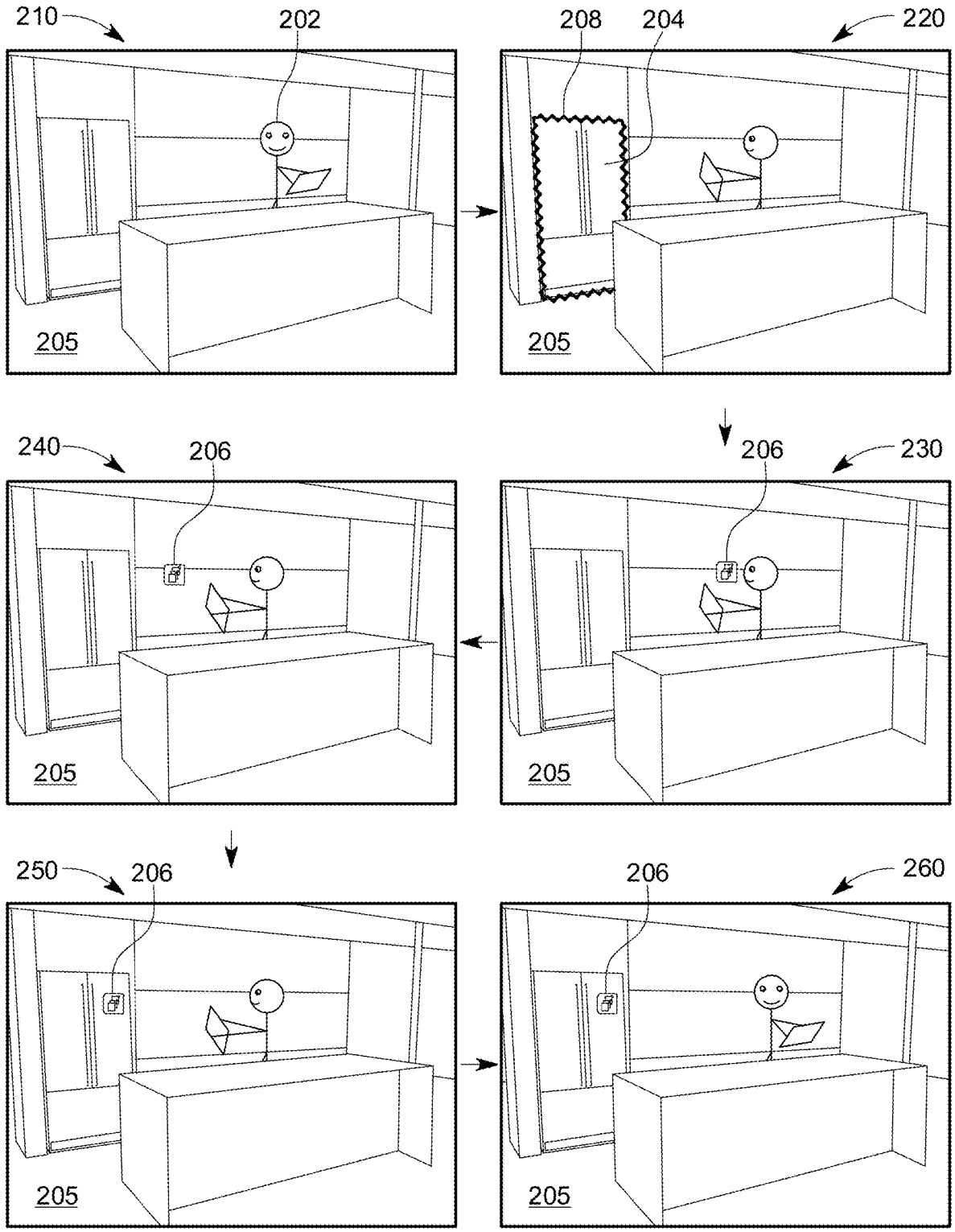
FIG. 2 illustrates associating a content object with a region of a physical environment in accordance with some implementations.

FIG. 2 illustrates a series of snapshots to exemplify associating a content object with a region (e.g., landmark) of a physical environment. In particular, FIG. 2 illustrates a user anchoring content object 206 (e.g., a virtual widget for a text application) within an example physical environment 205 (e.g., a kitchen) and providing views of the physical environment (e.g., via an optical see-through device) to a user. The content object 206 is displayed to the user as world-locked with 6 DoF after the content object 206 is anchored to the face of the refrigerator 204. For example, snapshot 210 represents a user (e.g., user 25 of FIG. 1) within a physical environment 205 holding device 202 (e.g., device 10 of FIG. 1), such as a smartphone or tablet. Alternatively, the user could be wearing device 202, such as an HMD. Snapshot 220 represents the user looking at a particular region of the environment (e.g., refrigerator 204). Through techniques described herein, the system receives a command and/or detects that the user wants to anchor a content object to that particular region. For example, a verbal command, gaze detection, and/or other user interaction that indicates the anchor action to be initiated to that particular region. The system, as illustrated in snapshot 220, provides a virtual illumination effect 208 around the refrigerator 204 indicating the particular region that was detected to anchor a content object (e.g., the user gazed or pointed device 202 at the refrigerator 204 for longer than a threshold length of time such as more than 3 seconds). Snapshot 230 represents the system generating the content object 206 and displaying the content object 206 close to the view of the user. Snapshot 240 represents the system displaying the content object 206 moving from the initial viewpoint in snapshot 230 to a position closer to the anchor point (e.g., refrigerator 204). Snapshot 250 represents the system anchoring the content object 206 to the face of the refrigerator 204 (e.g., the anchor location). Thus, the content object 206 (e.g., a text widget) has a 3D world-locked/6 DoF position on the face of the refrigerator 204 that is visible when the refrigerator is in view of the device 202. Snapshot 260 represents the viewpoint of the device 202 as looking away from the anchor location (e.g., the user turns to a different direction) and the content object 206 remains anchored at the same 3D location on the face of the refrigerator 204.

The anchoring point for the content object 206 allows a user to identify a landmark within the physical environment to add and to anchor a virtual object/widget too. The landmarks may be large features within a room or space that would be visible from certain points within the room, or even in an outside setting (e.g., a backyard). Furniture or an entire wall could be used as a landmark (e.g., to activate a virtual TV screen). Looking towards a particular direction would be a general guide to help a user locate certain content that a user would then interact with in some way. In some implementations, it could be a very coarse entering, such as a general direction, to activate the virtual application. For example, if user knows his or her calendar is generally in a particular direction because it is anchored to a bookshelf in that direction. Thus, the user interface for the calendar may be triggered by gazing in that direction (gaze, tap, or some other type of interaction) that would activate that widget and retrieve the application content. If there's a notification for a message, retrieve it. If it is a responder action, a look towards that widget would activate it. In some implementations, it is not necessary to rely on absolute precision. For example, a user doesn't have to gaze directly at the object content 206 or tap on it. The user may only need to gaze in that general direction of the anchored widget for the system to active the application content associated with the widget.

The application content may include notifications, widgets, e-mail, text, calendar, apps, a timer (cooking and want to set timer), a weather app that appears next to mirror, and the like. The applications and associated widgets may be outside of your field of view that are available, but not always present. This allows the application widgets to be less visible for a better XR environment, but a user can always look at the location of the widget to retrieve the associated application content. This system allows for contextually relevant placement of apps, widgets, and other content items.

In some implementations, the content object 206 may be identified by the user or the system as a long-term application content or short-term application content or anchoring widgets within the user's XR environment. For example, for short term applications, a user may add a virtual note in a library setting when studying. For a long-term application, the user may anchor a calendar widget to a particular location above a desk in a home office. Therefore, the system would know that short-term text messages of notes on the bookshelf at the library would only be temporarily saved in the memory of the system to be anchored at that location, while the calendar widget would be kept at that location until the user move's the anchoring point of the calendar widget (e.g., saved in a long-term memory).

Figure 3:
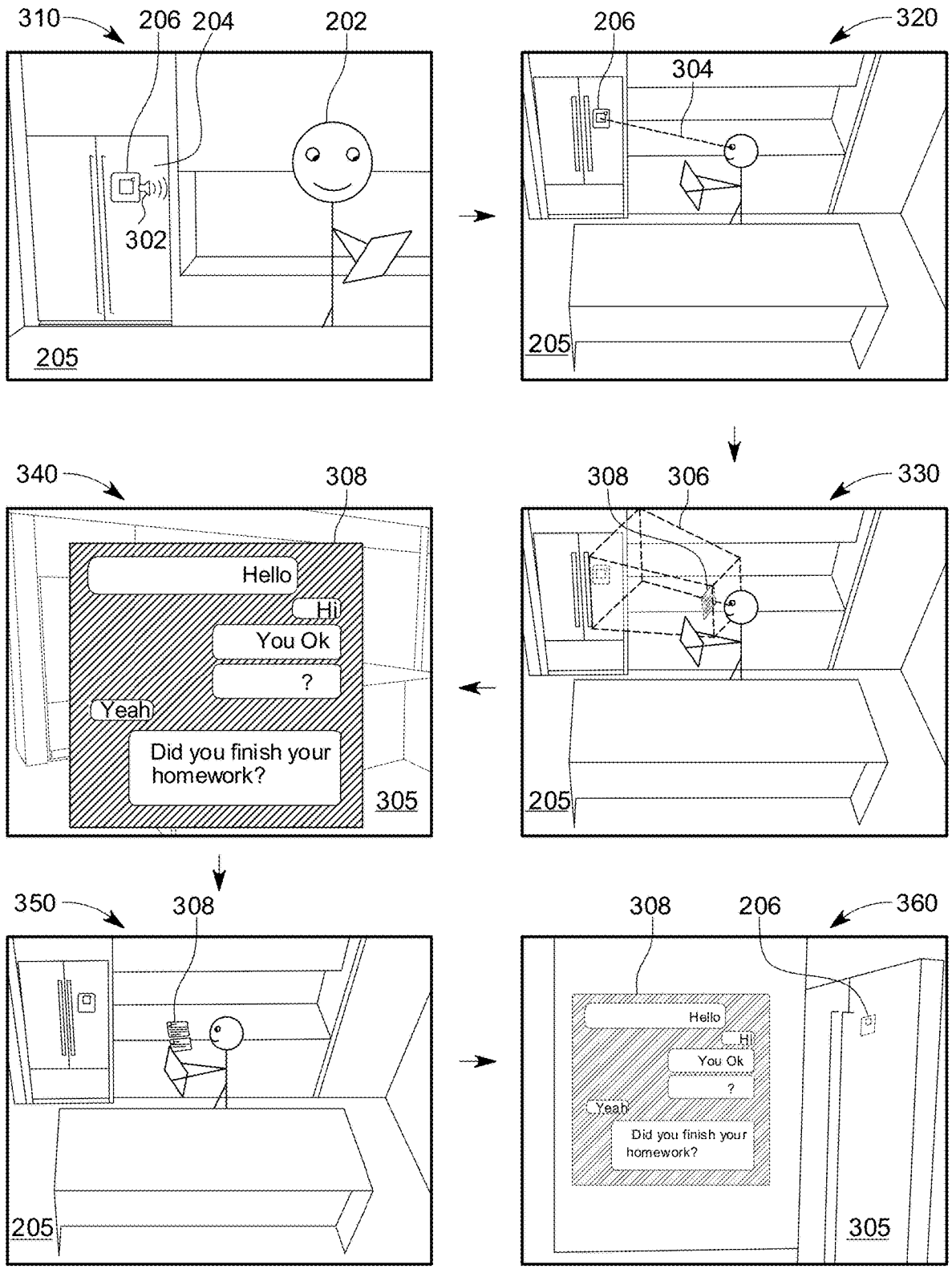
FIG. 3 illustrates interactions with a content object in accordance with some implementations.

FIG. 3 illustrates a series of snapshots to exemplify detecting an interaction with a content object anchored to a region (e.g., landmark) of a physical environment. In particular, FIG. 3 illustrates a user interacting with content object 206 (e.g., a virtual widget for a text application) within an example physical environment 205 (e.g., a kitchen) and providing views of the physical environment (e.g., via an optical see-through device 202) to a user after a user has anchored the content object 206 as illustrated in FIG. 2. Recall that the content object 206 is displayed to the user as world-locked with 6 DoF because the content object 206 is anchored to the face of the refrigerator at the particular 3D location (e.g., x, y, z coordinates). FIG. 3 illustrates the user interacting with a widget (e.g., content object 206) to initiate a texting application 308 after receiving a notification 302 of an incoming message. Thus going from a world-locked view of the content object, to a headset display for the application content window.

For example, snapshot 310 represents a user (e.g., user 25 of FIG. 1) within a physical environment 205 holding a device 202 (e.g., device 10 of FIG. 1). Alternatively, the user could be wearing the device 202 such as an HMD. The viewpoint of the device 202 is away from the refrigerator 204, thus, the content object 206 is not currently in view of the user via device 202. A notification 302 of an incoming message is provided to the user. The notification 302, as illustrated, provides an audio cue (e.g., spatialized audio) such as a "ping" to indicate to the user of the incoming message (e.g., an alert notification from an application). Alternatively, other methods of notifications could be provided. For example, a visual cue may be presented within the viewpoint of the device 202 such that the user could be presented with an object, a message, and/or directional arrows of an alert notification. Snapshot 320 represents the user looking at the particular region of the environment (e.g., refrigerator 204). Through techniques described herein, the system detects (e.g., via gaze characteristics) that the user wants to access a text application associated with the widget (e.g., content object 304) that is anchored to the face of the refrigerator 204. The system, as illustrated in snapshot 320, is shown as detecting the gaze 304 of the user towards the content object 206.

Snapshot 330 represents the system detecting the user's interaction (e.g., gaze) within the active zone 306 and generating and displaying the text application window 308 close to the view of the user and within the active zone 306. The active zone 306 is illustrated as an example and is not visible to the viewpoint of the device 202 or user of the device 202. In some implementations, the active zone 306 is illustrating the actual viewpoint of the device 202. Alternatively, the active zone 306 illustrates a foveal region of the user such that the user may still see outside of the active zone 306 via peripheral vision. Snapshot 340 illustrates exemplary views provided by display elements of device 202 (e.g., the user's viewpoint). The views present an XR environment 305 that includes aspects of the text application window 308 and aspects of the physical environment 205. For snapshot 340, the system is displaying the text application window 308 such that it appears close to the user and overlaid on the view of the physical environment, thus creating a view of XR environment 205 (e.g., a mixed reality or augmented reality environment).

Additionally, or alternatively, the content displayed for the text application window 308, could be displayed within content object 206. For example, a messaging application that displays the text of your messages on the content object 206 which is anchored to the refrigerator 204. Thus, the user would read his or her text messages presented on the content object 206 at the location of the refrigerator 204, and not within the separate text application window 308.

Snapshot 350 represents the system detecting another user's interaction that signifies the user is either looking away from the text application window 308, looking away from the content object 206, or the user has provided some other type of command or physical motion to notify the system of a disinterest in the text application window 308 or content object 206 being within view. Thus, the system, as illustrated in snapshot 350, is displaying text application window 308 as fading away and shrinking in size. Snapshot 360 illustrates exemplary views provided by display elements of device 202 (e.g., the user's viewpoint) after the user initiated an interaction (or lack thereof) to notify the system of a disinterest in the text application window 308 being within view as illustrated in snapshot 350. The views present an XR environment 305 that includes aspects of the text application window 308 and aspects of the physical environment 205. The system, as illustrated in snapshot 350 and snapshot 360, is displaying text application window 308 as fading away and shrinking in size as the user is looking away from the content object 206.

The concept of fading away the application content allows for easier transitions for the user for a more enjoyable XR environment. At a certain point (e.g., outside of an activation zone) as a user turns away, the UI transitions away from the application content (e.g., view 360). The activation zone based on an anchored content object encourages a user to stay relatively stationary and provide a type target to look at. As a user moves, the UI starts to display to the user that the application content window is going to deactivate (e.g., fades away). Thus, you can dismiss the application content window by turning away. In some implementations, transitioning away or fading away the application content window may be based on a rate of turning his or her head exceeding a threshold or an amount of turning his or her head exceeding a threshold, such that the application content will remain in the 3D location where it was just before the user turned his or her head quickly away.

The HUD view (e.g., view 330) shows the application content window as closer, larger, and "stuck" to the viewpoint of the device/user. The view of the application content window is locked until the user satisfies some condition and it goes back to a widget and anchored to the landmark. This anchoring of application content when not in use can provide localization of content only when necessary. This would take more computational power through a visual inertial odometry (VIO) system or other tracking system, but once the system transitions in a HUD mode there is only a need to track rough alignment, thus there are less computations once in HUD mode (e.g., "head locked"). Therefore, the benefits of the HUD display of the application content window being head locked include efficiency, battery life, amount of sensing/compute power required. Also, in certain implementations, better legibility of content (e.g., text messages) because the application content window is at a fixed distance from the user's viewpoint. For example, like holding up a book at perfect distance, it becomes easier to read and understand. Thus, the advantages of the system described herein provide aspects to the whole XR environment of reading text messages (e.g., via application content window 308).

Figure 4:
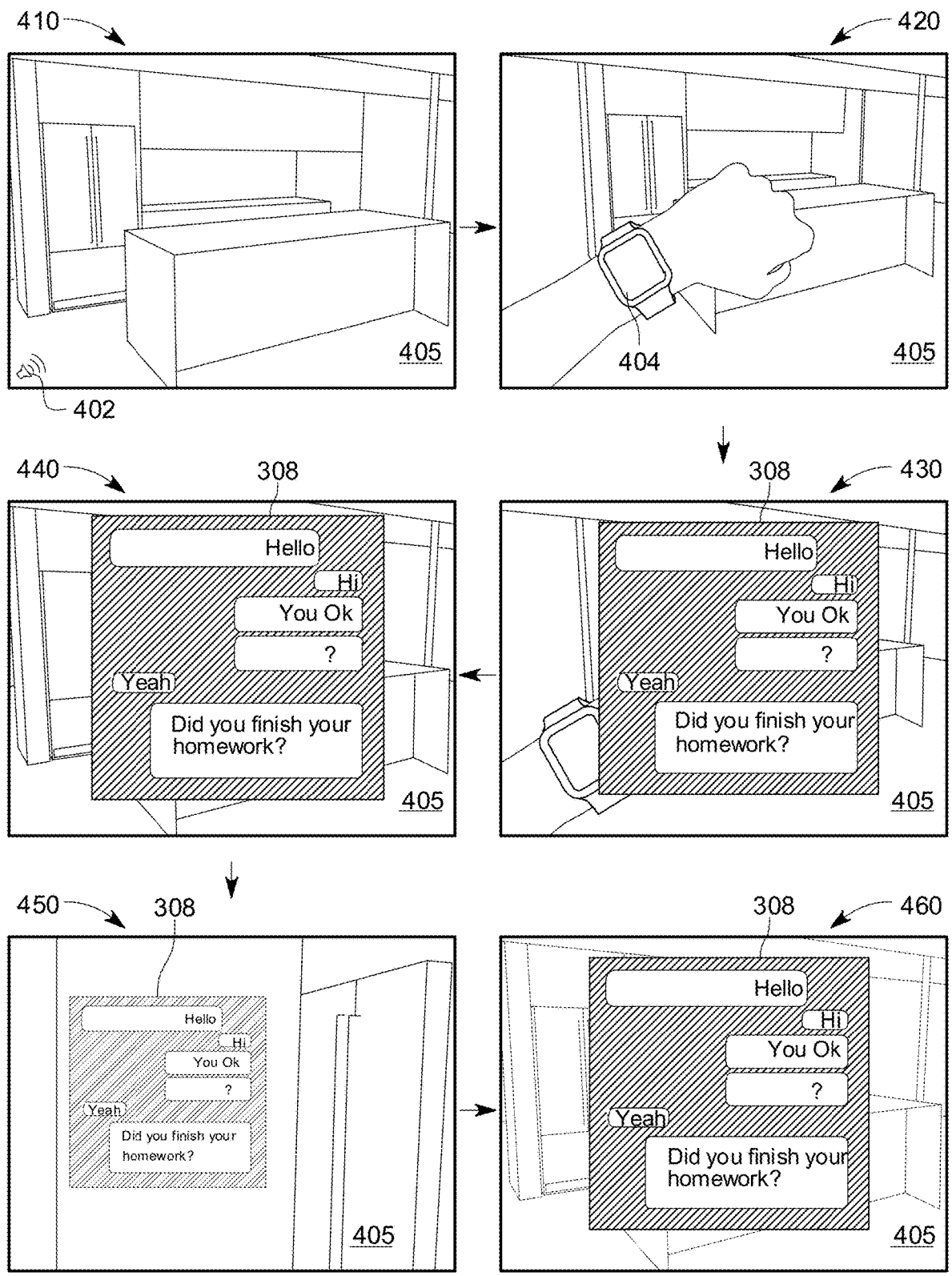
FIG. 4 illustrates interactions with an application in accordance with some implementations.

FIG. 4 illustrates a series of exemplary views provided by the display elements of a device, such as device 202 (e.g., an HMD). The views present an XR environment 405 that includes aspects of virtual application content and aspects of a physical environment (e.g., environment 205 of FIG. 2) to exemplify detecting an interaction with an application on a second device (e.g., a smart watch) to initiate a texting application 308 after receiving a notification 302 of an incoming message. In particular, FIG. 4 illustrates views for a user interacting with a text application within an example physical environment (e.g., a kitchen) and providing views of the physical environment (e.g., via an optical see-through device 202) to a user.

For example, view 410 represents a viewpoint of a user (e.g., user 25 of FIG. 1) within a physical environment 205 wearing a device (e.g., device 10 of FIG. 1), such as an HMD. A notification 402 of an incoming message is provided to the user. The notification 402, as illustrated, provides an audio cue (e.g., spatialized audio) such as a "ping" to indicate to the user of the incoming message (e.g., an alert notification from an application) from a second device 404 (e.g., a smart watch). Alternatively, other methods of notifications could be provided. For example, a visual cue may be presented within the viewpoint of the device 202 such that the user could be presented with an object, a message, and/or directional arrows of an alert notification. View 420 represents the user looking at his or her left arm/hand where the second device is located. This particular viewpoint (e.g., looking in this direction as shown in view 410) is now detected by the system as the active zone of the user when interacting with the device 404. View 430 represents the system detecting the user's interaction (e.g., raising the watch within an active zone) and generating and displaying the text application window 308 close to the view of the user. View 440 represents the system, while displaying the text application window 308, detecting the user's action of placing his or her hand out of the view (e.g., moving the device 404 outside of the active zone), but still displaying the text application window 308 because the user is still focused (e.g., via gaze detection) on the text application window 308. View 450 represents the system detecting that the user has temporarily moved his or her viewing direction to another location outside of the active zone. For example, the user was briefly distracted by some event in the physical environment (e.g., a pet or a child). Thus, the system, based on the user "looking away" from the initial active zone, starts to fade away and/or shrink the text application window 308. However, view 460 illustrates that the user has returned to a viewpoint as the original view when the text application window 308 was initially active (e.g., within an activation zone). Thus, the system is displaying the text application window 308 as initially intended when the user activated the text application by looking at his or her watch in view 420, before they were briefly distracted in view 450.

Figure 5A:
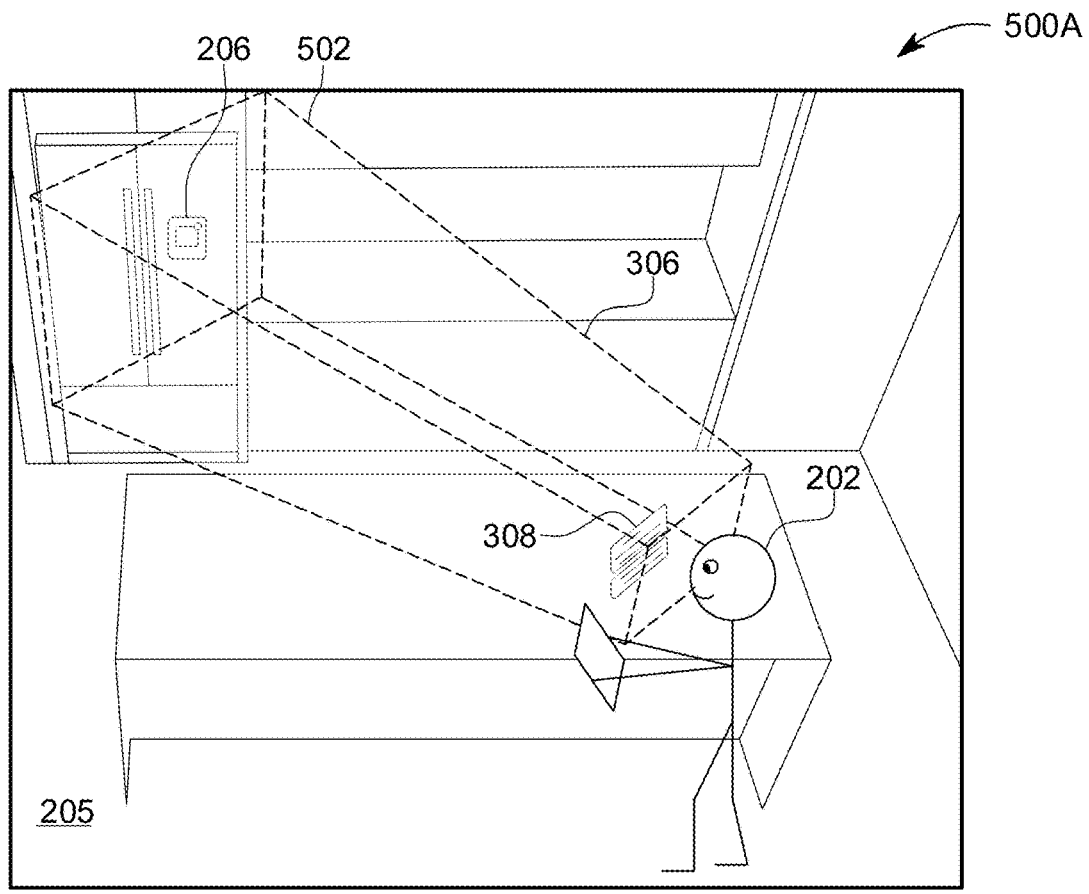
FIGS. 5A, 5B illustrate different fields of view during interactions with a content object in accordance with some implementations.
Figure 5B:
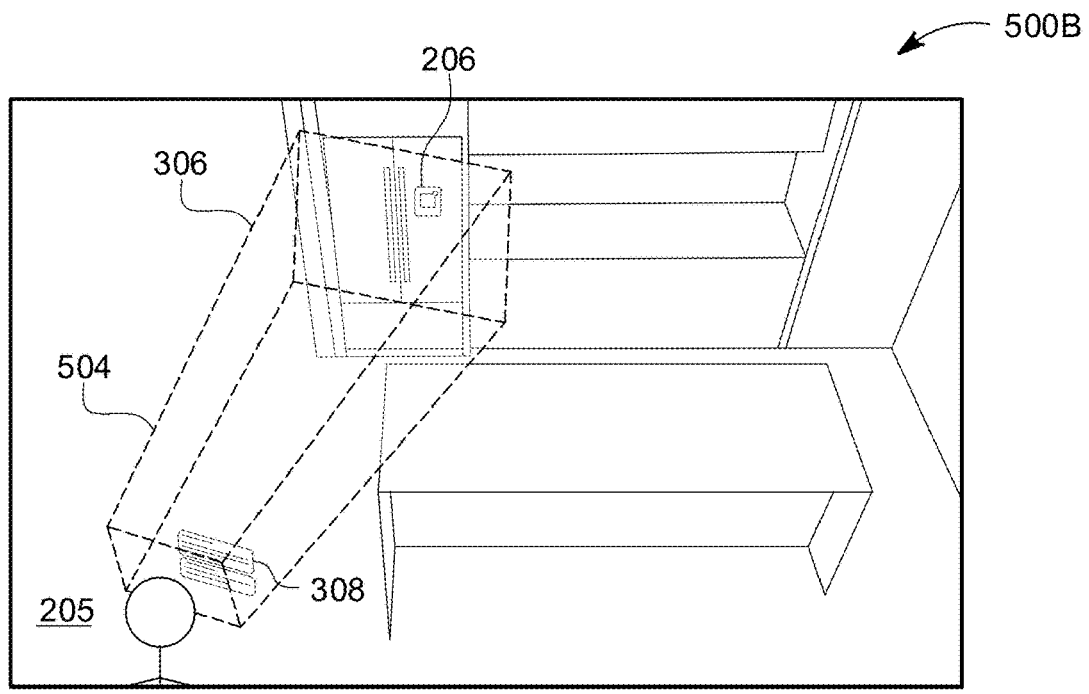

FIGS. 5A, 5B illustrate snapshots 500A, 500B, respectively, to exemplify detecting an interaction with a content object anchored to a region (e.g., landmark) of a physical environment. In particular, FIGS. 5A, 5B illustrate a user interacting with content object 206 (e.g., a virtual widget for a text application) within an example physical environment 205 (e.g., a kitchen) and providing views of aspects of the physical environment (e.g., via an optical see-through device 202) and aspects of a virtual application to a user after a user has anchored the content object 206 to the face of the refrigerator as illustrated and discussed herein in FIG. 2. Recall that the content object 206 is displayed to the user as world-locked with 6 DoF because the content object 206 is anchored to the face of the refrigerator at the particular 3D location (e.g., x, y, z coordinates). FIGS. 5A, 5B illustrate the user interacting with a widget (e.g., content object 206) to initiate a texting application 308. Additionally, FIGS. 5A, 5B illustrate different respective viewpoints and active zones 502 and 504, respectively.

In some implementations, based on a predefined threshold distance between the device and the anchored content object 206 (e.g., 15 feet), the system may not present the text application window 308 until the user is within the threshold distance (e.g., moves closer to the widget). For example, if the user in snapshot 500B stepped back further away (e.g., greater than 15 feet away), the text application window 308 may disappear or start fading away, even though the user's gaze may still be towards the anchored content object 206.

Figure 6:
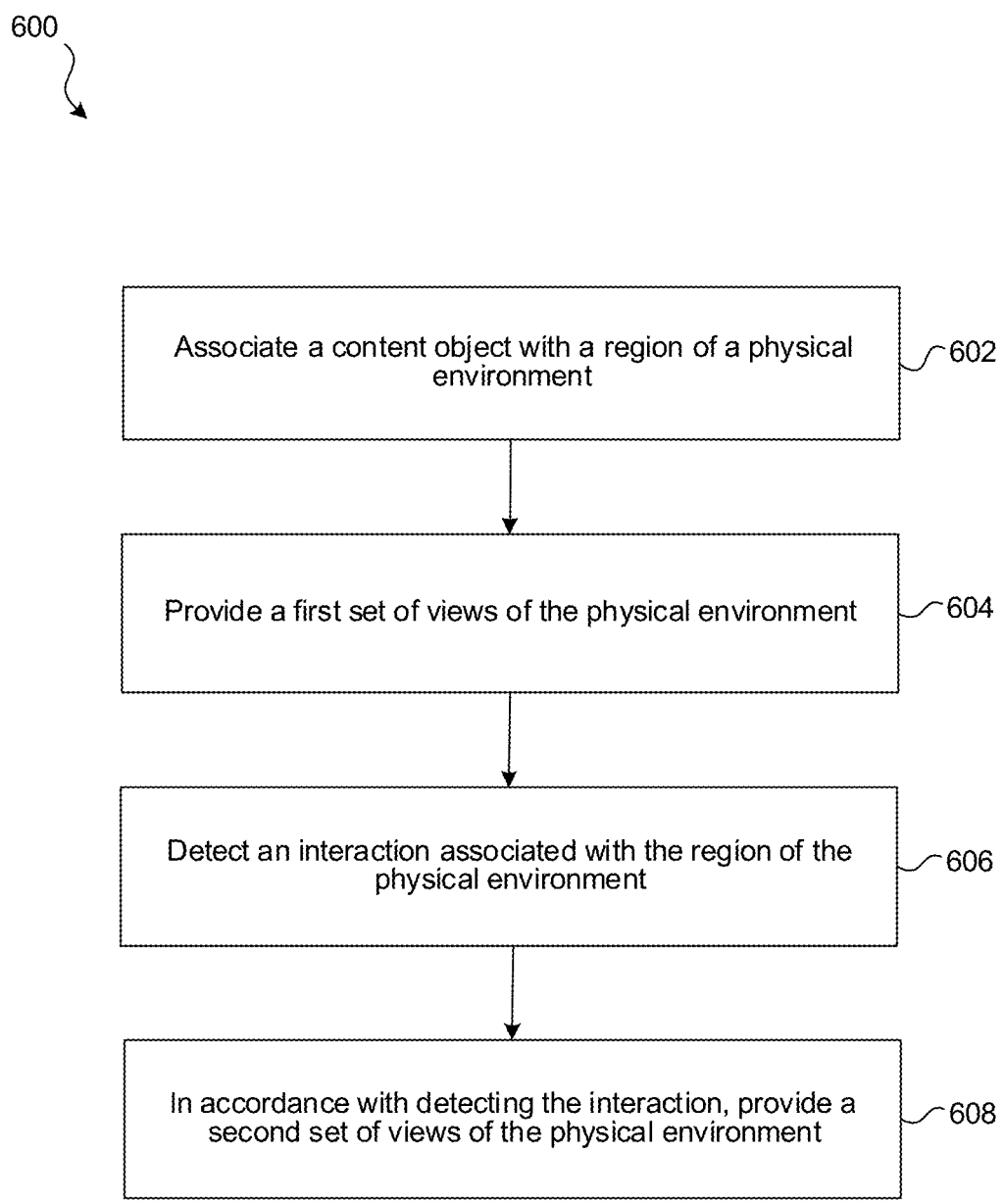
FIG. 6 is a flowchart representation of detecting interactions with a content object and providing a different set of views with a different positional constraint in accordance with some implementations.

FIG. 6 is a flowchart illustrating an exemplary method 600. In some implementations, a device such as device 10 (FIG. 1) performs the techniques of method 600 to detect interactions with a content object and providing a different set of views with a different positional constraint within a 3D environment (e.g., visual and/or auditory electronic content that could be of the real-world physical environment, virtual content, or a combination of each). In some implementations, the techniques of method 600 are performed on a mobile device, desktop, laptop, HMD, or server device. In some implementations, the method 600 is performed on processing logic, including hardware, firmware, software, or a combination thereof. In some implementations, the method 600 is performed on a processor executing code stored in a non-transitory computer-readable medium (e.g., a memory). Examples of method 600 are illustrated with reference to FIGS. 2-4.

At block 602, the method 600 associates a content object with a region (e.g., a landmark) of a physical environment. In some implementations, the content object is an application widget (e.g., a text application and associated widget as illustrated in FIGS. 2-5). For example, associates a content object with a region may include associating a text widget with a refrigerator as illustrated in FIG. 2. Associating a content object may involve receiving input from the user making the association. For example, a user may provide a verbal command to active a text widget. Or a user may provide a particular motion with his or her hands. Alternatively, the device may include an input device such as a keyboard (physical or virtual) for the user to enter a command via text.

In some implementations, associating the content object with the region of the physical environment is based on identifying the region of the physical environment. For example, identifying the region as a particular object (e.g., a refrigerator) or landmark (e.g., a corner of a table) within the physical environment (e.g., the kitchen).

In some implementations, associating the content object with the region of the physical environment includes obtaining an image of the physical environment that includes the region, and performing object recognition (e.g., semantic segmentation via machine learning) associated with an object type (e.g., refrigerator) or an area type (e.g., work space, vanity area, kitchen, etc.) associated with the region of the physical environment to identify the region of the physical environment based on the obtained image.

In some implementations, associating the content object with the region of the physical environment includes obtaining a map of the physical environment that includes the region, and performing object recognition (e.g., semantic segmentation via machine learning) associated with an object type (e.g., refrigerator) or an area type (e.g., work space, vanity area, kitchen, etc.) associated with the region of the physical environment to identify the region of the physical environment based on the obtained map. For example, the obtained map of the physical environment may include a precise simultaneous localization and mapping (SLAM) map. SLAM-based approach includes a geometric map with path planning and localization for navigation that an object detection process via machine learning algorithm can utilize to detect particular regions or objects within a physical environment.

Alternatively, in some implementations, the obtained map of the physical environment may include a GPS based classification map of the physical environment (e.g., a physical room layout), and identifying a particular object or region of the physical environment may be determined by GPS coordinates via the device. For example, if the user with the device is close to the refrigerator and the user initiates to associate a content object (widget), then the system could determine that the user desires the closest object as the region for the association based on the GPS coordinates of the device as being closer to the refrigerator than other detected objects.

At block 604, the method 600 provides a first set of views of the physical environment (e.g., via an optical see-through device), wherein the content object is displayed using a first positional constraint when included in the first set of views. For example, the text widget has a 3D world-locked/6-DOF position on the face of the refrigerator that is visible when the refrigerator is in view.

In some implementations, the first positional constraint includes a world-locked position in which location and rotation of the content object are fixed relative to a coordinate system of the physical environment when the content object is displayed. For example, as illustrated in FIG. 2, the text widget 206 is fixed to a particular location (e.g., a particular x, y, z coordinate) on the face of the refrigerator. Thus, regardless of where the user is looking, the widget remains at that particular location.

At block 606, the method 600 detects an interaction associated with the region of the physical environment. For example, detecting an interaction may include detecting that the user is gazing at the refrigerator, moved closer to the refrigerator, pointed at the refrigerator, or the like.

In some implementations, detecting the interaction associated with the region of the physical environment includes determining that the electronic device (e.g., the user wearing an HMD or holding a smart phone or a tablet) has moved within a distance threshold of the region of the physical environment. For example, a distance threshold of ten feet may be implemented by the device, such that the text widget would only be visible to the user if they were within ten feet of the refrigerator (e.g., the region the content object was associated with).

In some implementations, detecting the interaction associated with the region of the physical environment includes tracking a pose of the electronic device relative to the physical environment, and detecting, based on the pose of the electronic device, that a view of a display of the electronic device is oriented towards the content object. For example, position sensors may be utilized to acquire positioning information of the device (e.g., device 10). For the positioning information, some implementations include a visual inertial odometry (VIO) system to determine equivalent odometry information using sequential camera images (e.g., light intensity images such as RGB data) to estimate the distance traveled. Alternatively, some implementations of the present disclosure may include a SLAM system (e.g., position sensors). The SLAM system may include a multi-dimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In some implementations, detecting the interaction associated with the region of the physical environment includes tracking a pose of the electronic device relative to the physical environment, and detecting, based on the pose of the electronic device, that a view of a display of the electronic device is oriented towards the content object.

In some implementations, detecting the interaction associated with the region of the physical environment includes tracking a gaze direction, and detecting that the gaze direction corresponds to the region of the physical environment. In some implementations, tracking the gaze of a user may include tracking which pixel the user's gaze is currently focused upon. For example, obtaining physiological data (e.g., eye gaze characteristic data 40) associated with a gaze of a user may involve obtaining images of the eye or electrooculography signal (EOG) data from which gaze direction and/or movement can be determined. In some implementations, the 3D environment may be an XR environment provided while a user wears a device such as an HMD. Additionally, the XR environment may be presented to the user where virtual reality images may be overlaid onto the live view (e.g., augmented reality (AR)) of the physical environment. In some implementations, tracking the gaze of the user relative to the display includes tracking a pixel the user's gaze is currently focused upon.

In some implementations, tracking a gaze characteristic (e.g., eye gaze characteristic data 40) includes tracking a direction of the gaze, a velocity of the gaze, and/or gaze fixations (e.g., derived from eye gaze dynamics and saccade characteristics). In some implementations, the gaze characteristic is derived from a saccade characteristic (e.g., microsaccades and saccadic intrusions). In some implementations, other measures of gaze characteristic stability can include intersaccade interval (amount of time between saccades), microsaccade rate, and determined head movements from an inertial measurement unit (IMU) and/or cameras (e.g., IMU and/or cameras on a device, such as device 10 of FIG. 1).

At block 608, in accordance with detecting the interaction, the method 600 provides a second set of views of the physical environment, such that the content object is displayed using a second positional constraint when included in the second set of views. In some implementations, the second positional constraint is different than the first positional constraint. For example, the text widget may have a less world-locked position (e.g., rotated towards the user or moved closer to the user) than the being locked to a particular location. Alternatively, the text widget may be in a device-locked position (e.g., heads-up display (HUD)) such that the user can view the text widget no matter which direction the user is looking.

In some implementations, the second positional constraint includes a device-locked position in which location and rotation of the content object are fixed relative to a coordinate system of the electronic device when the content object is displayed. For example, the HUD (e.g., "head-locked") view of application content window 308 as illustrated in view 340 in FIG. 3.

In some implementations, the content object (e.g., content object 206) includes an associated content application window (e.g., texting application 308), and displaying the content object using the second positional constraint includes displaying the associated content application window in a device-locked position in which location and rotation of the associated content application window are fixed relative to a coordinate system of the electronic device when the associated content application window is displayed, and displaying the content object in a world-locked position in which location and rotation of the content object are fixed relative to a coordinate system of the physical environment when the content object is displayed. For example, as illustrated in FIG. 3, the content object 206 is anchored (e.g., world-locked) to the refrigerator 204, and the texting application 308 is fixed to the user's view (e.g., device-locked).

In some implementations, the method 600 further includes detecting a second interaction associated with the region of the physical environment with respect to the display of the content object, and in accordance with detecting the second interaction, providing a third set of views of the physical environment. For example, the HUD view of application content window 308 as being faded away and shrunk, as illustrated in view 360 in FIG. 3.

In some implementations, the content object is displayed using the first positional constraint when included in the third set of views. For example, the content object (e.g., widget) is displayed as 3D world-locked on the face of the refrigerator. Alternatively, the content object is not displayed in the third set of views. For example, the user is looking away from the content object (e.g., looking away from the refrigerator), or the user has provided some type of interaction that would remove the content object from view.

Figure 7:
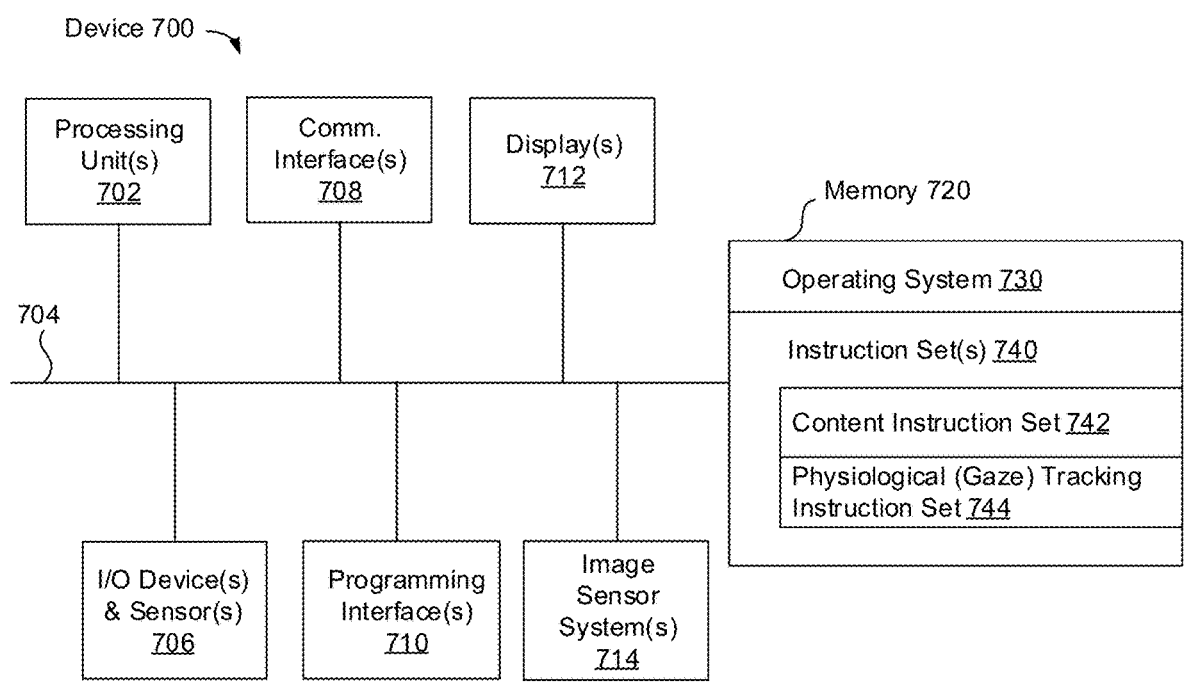
FIG. 7 illustrates device components of an exemplary device according to some implementations.

FIG. 7 is a block diagram of an example device 700. Device 700 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 702 (e.g., microprocessors, ASICs, FPGAs, CPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 712 correspond to diffractive, reflective, polarized, holographic, etc. waveguide displays. In one example, the device 10 includes a single display. In another example, the device 10 includes a display for each eye of the user.

In some implementations, the one or more image sensor systems 714 are configured to obtain image data that corresponds to at least a portion of the physical environment 5. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include a content instruction set 742 and a physiological tracking instruction set 744. The instruction set(s) 740 may be embodied a single software executable or multiple software executables.

In some implementations, the content instruction set 742 is executable by the processing unit(s) 702 to provide and/or track content for display on a device. The content instruction set 742 may be configured to monitor and track the content over time (e.g., while viewing an XR environment), generate and display content objects, and/or providing different sets of views using two or more different positional constraints. In some implementations, the content instruction set 742 may be configured to inject content objects into content using one or more of the techniques discussed herein or as otherwise may be appropriate. To these ends, in various implementations, the instruction includes instructions and/or logic therefor, and heuristics and metadata therefor.

In some implementations, the physiological tracking (e.g., eye gaze characteristics) instruction set 744 is executable by the processing unit(s) 702 to track a user's eye gaze characteristics or other physiological attributes using one or more of the techniques discussed herein or as otherwise may be appropriate. To these ends, in various implementations, the instruction includes instructions and/or logic therefor, and heuristics and metadata therefor.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 8:
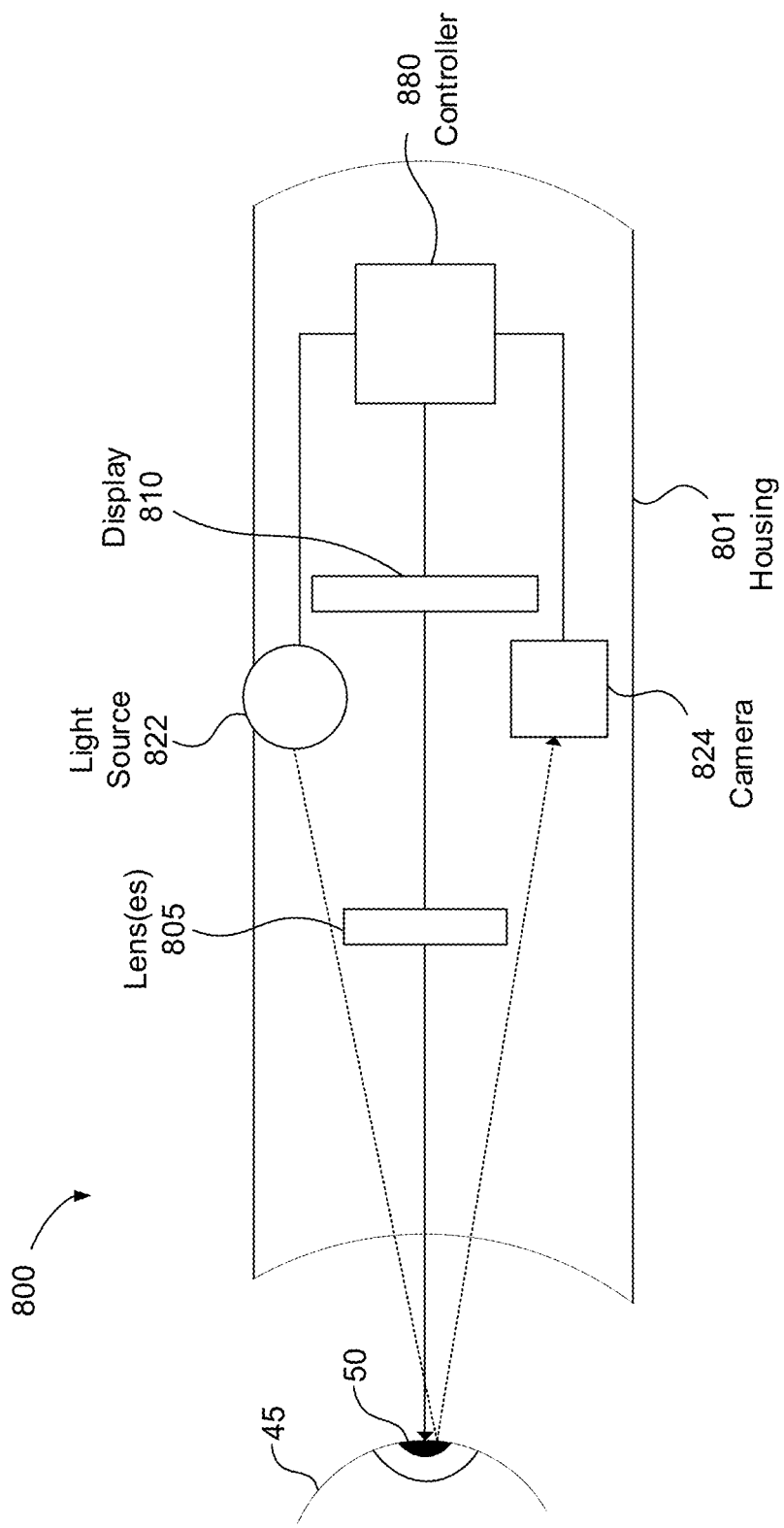
FIG. 8 illustrates an example head-mounted device (HMD) in accordance with some implementations.

FIG. 8 illustrates a block diagram of an exemplary head-mounted device 800 in accordance with some implementations. The head-mounted device 800 includes a housing 801 (or enclosure) that houses various components of the head-mounted device 800. The housing 801 includes (or is coupled to) an eye pad (not shown) disposed at a proximal (to the user 25) end of the housing 801. In various implementations, the eye pad is a plastic or rubber piece that comfortably and snugly keeps the head-mounted device 800 in the proper position on the face of the user 25 (e.g., surrounding the eye 45 of the user 25).

The housing 801 houses a display 810 that displays an image, emitting light towards or onto the eye of a user 25. In various implementations, the display 810 emits the light through an eyepiece having one or more lenses 805 that refracts the light emitted by the display 810, making the display appear to the user 25 to be at a virtual distance farther than the actual distance from the eye to the display 810. For the user 25 to be able to focus on the display 810, in various implementations, the virtual distance is at least greater than a minimum focal distance of the eye (e.g., 7 cm). Further, in order to provide a better user experience, in various implementations, the virtual distance is greater than 1 meter.

The housing 801 also houses a tracking system including one or more light sources 822, camera 824, and a controller 880. The one or more light sources 822 emit light onto the eye of the user 25 that reflects as a light pattern (e.g., a circle of glints) that can be detected by the camera 824. Based on the light pattern, the controller 880 can determine an eye tracking characteristic of the user 25. For example, the controller 880 can determine a gaze direction and/or a blinking state (eyes open or eyes closed) of the user 25. As another example, the controller 880 can determine a pupil center, a pupil size, or a point of regard. Thus, in various implementations, the light is emitted by the one or more light sources 822, reflects off the eye 45 of the user 25, and is detected by the camera 824. In various implementations, the light from the eye 45 of the user 25 is reflected off a hot mirror or passed through an eyepiece before reaching the camera 824.

The display 810 emits light in a first wavelength range and the one or more light sources 822 emit light in a second wavelength range. Similarly, the camera 824 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 810 by looking at it), provide foveated rendering (e.g., present a higher resolution in an area of the display 810 the user 25 is looking at and a lower resolution elsewhere on the display 810), or correct distortions (e.g., for images to be provided on the display 810).

In various implementations, the one or more light sources 822 emit light towards the eye of the user 25 which reflects in the form of a plurality of glints.

In various implementations, the camera 824 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 824 is an event camera including a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor:
associating a content object with a region of a physical environment, wherein the content object comprises an associated content application window;
providing a first set of views of the physical environment, wherein the content object is displayed using a first positional constraint when included in the first set of views, wherein the first positional constraint comprises a world-locked position, and wherein a location and a rotation of the content object are fixed relative to a first coordinate system associated with the physical environment when the content object is displayed;
detecting an interaction associated with the region of the physical environment; and
in accordance with detecting the interaction, providing a second set of views of the physical environment, wherein the content object is displayed using a second positional constraint when included in the second set of views, wherein the second positional constraint comprises a device-locked position or a body-locked position, wherein the location and the rotation of the content object are fixed relative to a second coordinate system associated with the electronic device when the content object is displayed, and wherein displaying the content object using the second positional constraint comprises displaying the associated content application window in the device-locked position or the body-locked position in which a location and a rotation of the associated content application window are fixed relative to the second coordinate system when the associated content application window is displayed.

2. The method of claim 1, wherein the content object comprises the associated content application window, and displaying the content object using the second positional constraint comprises:
the second coordinate system a coordinate system of the electronic device, and
displaying the content object in the world-locked position in which the location and the rotation of the content object are fixed relative to the coordinate system of the physical environment when the content object is displayed.

3. The method of claim 1, further comprising:
detecting a second interaction associated with the region of the physical environment with respect to the display of the content object; and
in accordance with detecting the second interaction, providing a third set of views of the physical environment.

4. The method of claim 3, wherein the content object is displayed using the first positional constraint when included in the third set of views.

5. The method of claim 3, wherein the content object is not displayed in the third set of views.

6. The method of claim 1, wherein associating the content object with the region of the physical environment is based on identifying the region of the physical environment.

7. The method of claim 1, wherein associating the content object with the region of the physical environment comprises:
obtaining an image or a map of the physical environment that includes the region; and
performing object recognition associated with an object type or an area type associated with the region of the physical environment to identify the region of the physical environment.

8. The method of claim 1, wherein detecting the interaction associated with the region of the physical environment comprises:
tracking a gaze direction; and
detecting that the gaze direction corresponds to the region of the physical environment.

9. The method of claim 1, wherein detecting the interaction associated with the region of the physical environment comprises:
determining that the electronic device moved within a distance threshold of the region of the physical environment.

10. The method of claim 1, wherein detecting the interaction associated with the region of the physical environment comprises:
tracking a pose of the electronic device relative to the physical environment; and detecting, based on the pose of the electronic device, that a view of a display of the electronic device is oriented towards the content object.

11. The method of claim 1, wherein the region of the physical environment is an object within the physical environment.

12. The method of claim 1, wherein the content object is an application widget.

13. The method of claim 1, wherein the electronic device is a head-mounted device (HMD).

14. A device comprising: a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising: associating a content object with a region of a physical environment, wherein the content object comprises an associated content application window; providing a first set of views of the physical environment, wherein the content object is displayed using a first positional constraint when included in the first set of views, wherein the first positional constraint comprises a world-locked position, and wherein a location and a rotation of the content object are fixed relative to a first coordinate system associated with the physical environment when the content object is displayed; detecting an interaction associated with the region of the physical environment; and in accordance with detecting the interaction, providing a second set of views of the physical environment, wherein the content object is displayed using a second positional constraint when included in the second set of views, wherein the second positional constraint comprises a device-locked position or a body-locked position, and wherein the location and the rotation of the content object are fixed relative to a second coordinate system associated with the device when the content object is displayed, and wherein displaying the content object using the second positional constraint comprises displaying the associated content application window in the device-locked position or the body-locked position in which a location and a rotation of the associated content application window are fixed relative to the second coordinate system when the associated content application window is displayed.

15. The device of claim 14, wherein the content object comprises the associated content application window, and displaying the content object using the second positional constraint comprises: the second coordinate system a coordinate system of the device, and displaying the content object in the world-locked position in which the location and the rotation of the content object are fixed relative to the coordinate system of the physical environment when the content object is displayed.

16. A non-transitory computer-readable storage medium, storing computer-executable program instructions on a computer to perform operations comprising: associating a content object with a region of a physical environment, wherein the content object comprises an associated content application window; providing a first set of views of the physical environment at a device, wherein the content object is displayed using a first positional constraint when included in the first set of views, wherein the first positional constraint comprises a world-locked position, and wherein a location and a rotation of the content object are fixed relative to a first coordinate system associated with the physical environment when the content object is displayed; detecting an interaction associated with the region of the physical environment; and in accordance with detecting the interaction, providing a second set of views of the physical environment, wherein the content object is displayed using a second positional constraint when included in the second set of views, wherein the second positional constraint comprises a device-locked position or a body-locked position, and wherein the location and the rotation of the content object are fixed relative to a second coordinate system associated with the device when the content object is displayed, and wherein displaying the content object using the second positional constraint comprises displaying the associated content application window in the device-locked position or the body-locked position in which a location and a rotation of the associated content application window are fixed relative to the second coordinate system when the associated content application window is displayed.

* * * * *